(12) United States Patent
Lewis et al.

(10) Patent No.: US 10,127,311 B2
(45) Date of Patent: Nov. 13, 2018

(54) PERSONALIZED CONTENT SHARING

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 665 days.

(21) Appl. No.: 14/639,276

(22) Filed: Mar. 5, 2015

(65) Prior Publication Data

US 2016/0259797 A1    Sep. 8, 2016

(51) Int. Cl.
*G06F 17/00*    (2006.01)
*G06F 17/30*    (2006.01)

(52) U.S. Cl.
CPC .... *G06F 17/3084* (2013.01); *G06F 17/30038* (2013.01); *G06F 17/3053* (2013.01)

(58) Field of Classification Search
CPC ......... G06F 17/30867; G06F 17/30598; G06F 17/30876; G06F 15/17306; G06F 17/30601
See application file for complete search history.

(56) References Cited

U.S. PATENT DOCUMENTS

| | | | |
|---|---|---|---|
| 8,386,619 B2 | 2/2013 | Mallet et al. | |
| 8,825,783 B1 | 9/2014 | Nace | |
| 8,924,465 B1 | 12/2014 | Tunguz-Zawislak | |
| 8,938,500 B1 | 1/2015 | Acharya | |
| 8,983,948 B1 | 3/2015 | Haugen et al. | |
| 9,026,592 B1 | 5/2015 | Marra | |
| 2009/0327885 A1 | 12/2009 | Aoki et al. | |
| 2013/0254309 A1 | 9/2013 | Jackson et al. | |
| 2013/0282504 A1* | 10/2013 | Lessin | G06Q 30/02 705/26.1 |
| 2014/0156633 A1* | 6/2014 | Duan | G06F 17/30442 707/713 |
| 2015/0019568 A1 | 1/2015 | Pelsmaeker et al. | |

OTHER PUBLICATIONS

PCT Application No. PCT/US2016/019748 filed Feb. 26, 2016, in the name of Google Inc. International Search Report and Written Opinion dated Mar. 14, 2016, 9 pages.

* cited by examiner

*Primary Examiner* — Truong V Vo
(74) *Attorney, Agent, or Firm* — Lowenstein Sandler LLP

(57) ABSTRACT

A method for providing personalized content sharing is disclosed. The method includes: receiving, by a processing device from a first computing device of a first user, a request pertaining to a video; determining affinity scores corresponding to a first plurality of other users that are contacts of the first user, the determining based on affinities of the first plurality of other users for the video; and providing, to the first computing device, a prompt to the first user to share the video with at least one second user of the first plurality of other users, the at least one second user determined based on the affinity scores.

20 Claims, 9 Drawing Sheets

400

Start

Transmit, to a server device, a request to perform an action on a content item for a first user
405

Receive, from the server device, data for use to perform the action and/or to prompt the first user to share the content item with one or more target users
410

Provide a prompt to the first user to share the content item with the target users using the received data
415

Receive an indication to share the content item with one or more of the target users
420

Transmit, to the server device, a request to share the content item with the target users
425

End

PERSONALIZED CONTENT SHARING

TECHNICAL FIELD

This disclosure relates to the field of content sharing and, in particular, to personalized content sharing with target users.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

The content sharing platforms can include one or more channels or one or more channels can be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. When the content of a channel is optimized (e.g., focused or specialized) for a coherent audience of users, users of the content sharing platform are more likely to keep watching content items of the channel and/or to subscribe to the channel.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method in accordance with one implementation of the disclosure includes receiving, by a processing device from a first computing device of a first user, a request pertaining to a first video, determining affinity scores corresponding to a first plurality of other users that are contacts of the first user, the determining based on affinities of the first plurality of other users for the first video, and providing, to the first computing device, a prompt to the first user to share the first video with at least one second user of the first plurality of other users, the at least one second user determined based on the affinity scores.

In some implementations, the method further includes receiving, from the first computing device in view of the prompt, an indication that the first video is to be shared with the second user; and causing information of the first video to be sent to a second computing device of the second user.

In some implementations, the method further includes determining the affinity scores based on affinities between the first plurality of other users and the first user.

In some implementations, the method further includes determining a first affinity score indicative of a likelihood that the second user would interact with the first video.

In some implementations, the method further includes determining a second affinity score indicative of an affinity between the second user and the first user.

In some implementations, the method further includes determining a third affinity score based on at least one of the first affinity score or the second affinity score, wherein the second user is further selected based at least in part on the third score.

In some implementations, the method further comprises: ranking the plurality of affinity scores, wherein the second user is further selected based on the ranking.

In some implementations, the method further includes identifying, using the processing device, at least one second video that the second user and a second plurality of users have interacted with, and identifying a first set of content items that the second plurality of users have interacted with.

In some implementations, the method further includes identifying, using the processing device, at least one third content item that the first user and a third plurality of users have interacted with; identifying a third plurality of users that have interacted with the third content item; and identifying a second set of content items that the third plurality of users have interacted with, wherein the second user is further determined based on the first set of content items and the second set of content items.

BRIEF DESCRIPTION OF THE DRAWINGS

The present disclosure is illustrated by way of example, and not by way of limitation, in the figures of the accompanying drawings.

FIG. 4 is a flow diagram illustrating a method for providing personalized content sharing functionality by a client device, according to some implementations of the disclosure.

DETAILED DESCRIPTION

Figure 1:
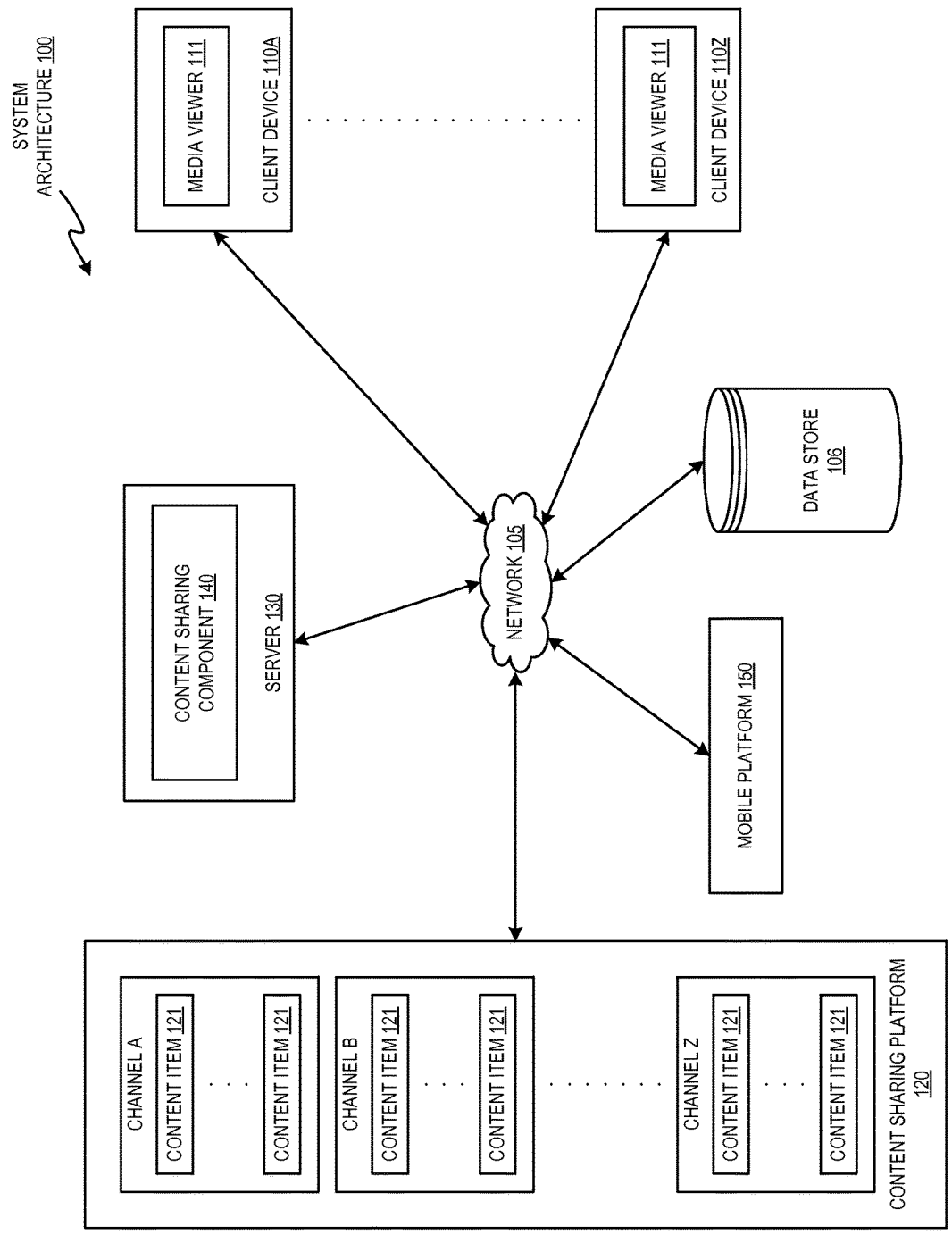
FIG. 1 illustrates an example of a system architecture, in accordance with some implementations of the disclosure.

Implementations are described for personalized content sharing. While a first user interacts with a content item (e.g., consuming a video), implementations of the disclosure may identify one or more other users (also referred to herein as "target users") that would likely be interested in the content item. Implementations of the disclosure may then prompt the first user to share the content item with the target users (e.g., by presenting a user interface, a message, a video, etc.). Upon receiving an indication that the first user intends to share the content item with one or more of the target users, implementations of the disclosure may send information related to the content item to the target users (e.g., by initiating a conversation between the first user and the target users using a media viewer, a messaging application, etc.).

As used herein, the term "content item" may refer to an electronic file that can be executed or loaded using software, firmware or hardware configured to present the content item to an entity. A content item may contain video content, audio content, text content, images, and/or any other content.

To identify the target users, implementations of the disclosure may determine one or more other users that are contacts of the first user (also referred to herein as "contact users"). As used herein, a contact of a given user may refer to a "friend," a "follower," a "subscriber," a "connection," a "phone contact," and/or any other user that is connected to the given user via a content sharing platform, a mobile platform, a social network platform, an email service, a phone service, and/or any other platform or service.

Implementations of the disclosure may select one or more of the contact users as target users with which the content item can be shared. For example, implementations of the disclosure calculate affinity scores based on affinities of the contact users for the content item and/or affinities between the contact users and the first user. The target users may then be identified based on the affinity scores (e.g., the top X contact users, the top ten percent of the contact users, etc.). In some implementations, affinities of a user and another entity (e.g., a channel, another user, etc.) may include the user's interactions with the entity and/or content associated with the entity. In one example, affinities of a user for a content item (e.g., a video, an image, an article, etc.) may include the user's interactions with the content item, such as consuming (e.g., watching, reviewing, reading, etc.) the content item, providing a comment in association with the content item, liking the content item, sharing the content item, uploading the content item to a content sharing platform, etc. In one example, affinities of a first user for a second user may include the first user's interactions with content items associated with the second user (e.g., videos, images, text, etc. shared by the second user via a content sharing platform).

As another example, implementations of the disclosure select one or more contact users that are connected to the first user via a particular platform or in a particular manner as being target users. In one example, the target users can be contact users that are connected to the first user via a content sharing platform, a mobile platform, etc. In another example, the target users can be contact users that have subscribed to content associated with the first user published via a content sharing platform.

Previously, content sharing platforms did not provide a solution for personalized content sharing. For example, to share a video via a content sharing platform, a user may have to publish the video on the content sharing platform and broadcast the video to all other users that are connected to the user via the content sharing platform. As such, these content sharing platforms and/or social networks are not able to provide a solution to share content items with particular contacts of the user that would likely interact with the content items.

Implementations of the disclosure allow a content sharing platform and/or a social network to provide personalized content sharing functionality by prompting a user to share a content item with contacts of the user that would likely interact with the content item. This can create high-quality content sharing experiences for users of the content sharing platform and can promote affinities between the users.

FIG. 1 illustrates an example of a system architecture 100, in accordance with one implementation of the disclosure, for personalized content sharing. The system architecture 100 includes client devices 110A through 110Z, a network 105, a data store 106, a content sharing platform 120, a server 130, and a mobile platform 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. Content sharing platform 120 may include any type of content delivery network providing access to content and/or media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel.

Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. An activity feed may be a list of recent activity associated with the user and occurring on the social network. If a user subscribes to multiple channels, the activity feed for each channel to which the user is subscribed can be combined into a syndicated activity feed. Information from the syndicated activity feed can be presented to the user. Although channels are described as one implementation of a content sharing platform, implementations of the disclosure are not limited to content sharing platforms that provide content items via a channel model.

Each channel may include one or more content items 121. Examples of a content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item.

A content item 121 may be consumed via the Internet and/or via a mobile device application. As used herein, "media," "media item," "online media item," "digital media," "digital media item," "content," and "content item" can include an electronic file that can be executed or loaded using software, firmware or hardware configured to present the digital content item to an entity. In one implementation, the content sharing platform 120 may store the content items 121 using the data store 106.

Mobile platform 150 may be and/or include one or more computing devices (e.g., servers), data stores, networks, software components, and/or hardware components that may be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephony communication, Short Message Service (SMS) messaging, Multimedia Message Service (MMS) messaging, text chat, video chat, and/or any other communication between users.

The mobile platform 150 may present to a user a listing (e.g., activity feed, feed, stream, wall, etc.) of objects (e.g., posts, content items (e.g., videos, images, audios, etc.), status updates, favorability indications, tags, messages, etc.) generated by other users of the mobile platform. The mobile platform 150 may also include a content sharing aspect that allow users to upload, view, tag, share, and/or perform any other function on content, such as text content, video content, image content, audio content, etc. Other users of the mobile platform 150 may comment on the shared content, discover new content, locate updates, share content, and otherwise interact with the provided content.

In one implementation, the content sharing platform 120 may be integrated with the mobile platform 150. For example, the mobile platform 150 may use the content sharing platform 120 to provide users with content sharing, content storage, content streaming, content processing, and/or any other service. In one example, a user of the mobile platform 150 may upload and/or share content via the content sharing platform 120. In another implementation, the mobile platform 150 may be separate from the content sharing platform 120.

In one implementation, the server 130 may be one or more computing devices (e.g., a rackmount server, a server computer, etc.). In one implementation, the server 130 may be included in the content sharing platform 120 and/or the mobile platform 150. In another implementation, the server 130 may be separate from the content sharing platform 120 and/or the mobile platform 150 but may communicate (e.g., exchange data with) the content sharing platform 120 and/or the mobile platform 150.

In one implementation, the server 130 may include a content sharing component 140. The content sharing component 140 can provide personalized content sharing functionality to users of the content sharing platform 120, the mobile platform 150, and/or any other platform. For example, the content sharing component 140 may prompt a first user to share a content item with one or more target users that would likely interact with the content item. The target users can include and/or be one or more contacts of the users. The target users can be identified based on information related to affinities between the target users and the first user, information related to affinities of the target users for the content item, and/or any other suitable information. In one example, affinities of a user for a content item (e.g., a video, an image, an article, etc.) may include the user's interactions (or a measurement or other indicator of the user's interactions) with the content item, such as consuming (e.g., watching, reviewing, reading, etc.) the content item, providing a comment in association with the content item, liking the content item, sharing the content item, uploading the content item to a content sharing platform, etc. In one example, affinities of a first user for a second user may include the first user's interactions with content items associated with the second user (e.g., videos, images, text, etc. shared by the second user via a content sharing platform).

In one implementation, the prompt can be provided to the first user when the media viewer 111 provides playback of the content item for the first user and/or presents information related to the content item using a user interface. In another implementation, the prompt can be provided to the first user upon the user uploading the content item to the content sharing platform 120, mobile platform 150, and/or any other platform.

Further description of the content sharing component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users or to any type of content delivery platform providing content to end users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120, the server 130, the mobile platform 150, and/or any other component of the system 100.

Figure 2:
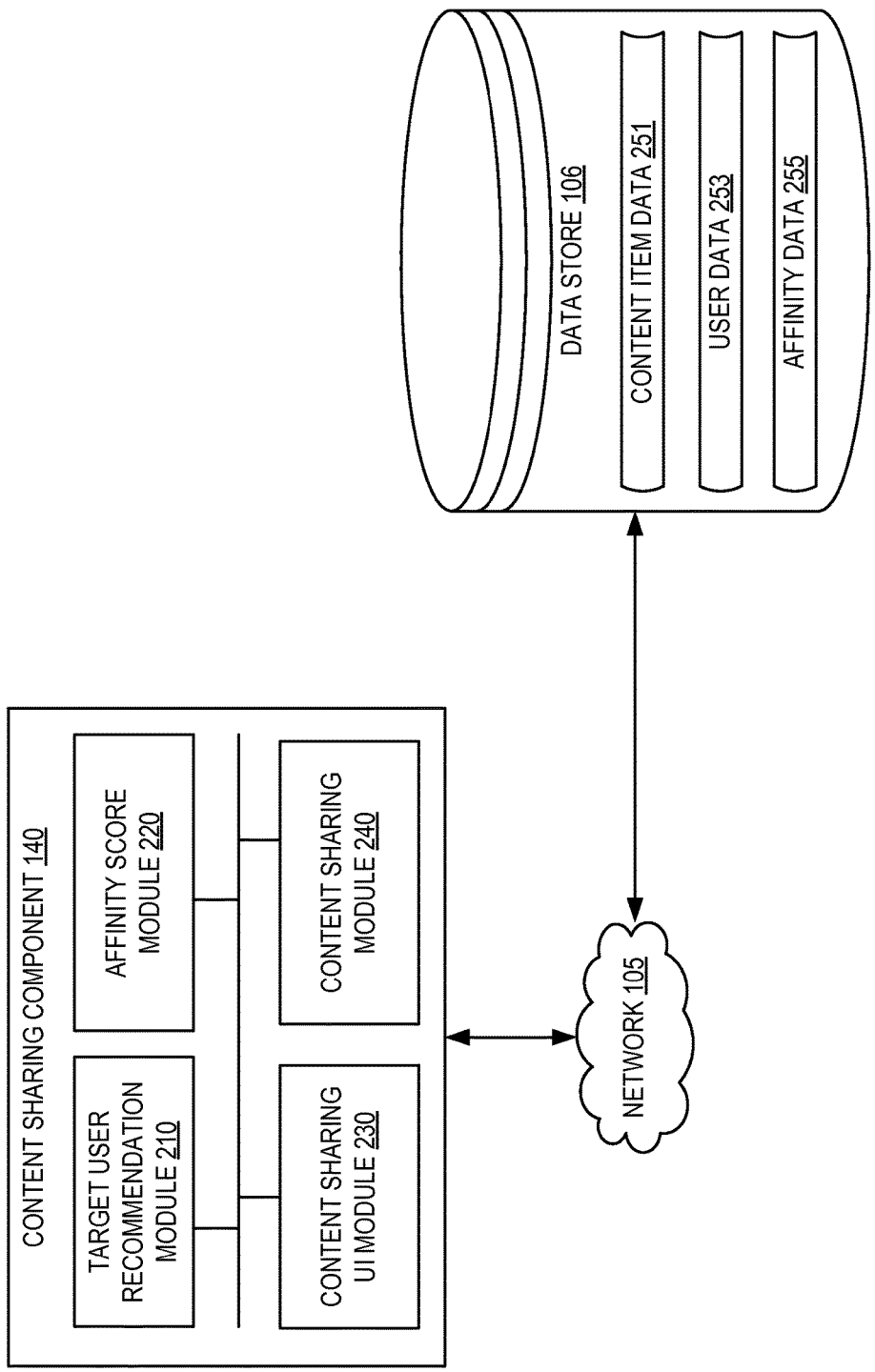
FIG. 2 is a block diagram illustrating examples of a content sharing component and a data store in accordance with some implementations of the disclosure.

FIG. 2 is a block diagram illustrating a content sharing component 140 and a data store 106 in accordance with one implementation of the disclosure. In one implementation, the content sharing component 140 includes a target user recommendation module 210, an affinity score module 220, a content sharing user interface (UI) module 230, and a content sharing module 240. More or less components may be included in the content sharing component 140 without loss of generality. For example, two of the modules may be combined into a single module, or one of the modules may be divided into two or more modules. In one implementation, one or more of the modules may reside on different computing devices (e.g., different server computers). In one embodiment, the content sharing component and the data store of FIG. 2 may be the same as the content sharing component 140 and the data store 106 of FIG. 1, respectively.

The content sharing component 140 may be communicatively coupled to each other and to the data store 106. For example, the content sharing component 140 may be coupled the data store 106 via a network (e.g., via network 105 as illustrated in FIG. 1). In another example, the data store 106 may be coupled directly to a server where the content sharing component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 251, user data 253, affinity data 255, and/or any other data that can be used to provide personalized content sharing functionality.

The content item data 251 may include information related to content items 121 of FIG. 1 and/or any other content item. For example, the content item data 250 may include information that can be used to provide playback of the content items 121 (e.g., video content, audio content, metadata, etc.). As another example, the content item data 250 may include identifying information related to the content items 121 (e.g. video identifiers, uniform resource locators (URLs), etc.).

The user data 253 may include information related to users of a content sharing platform, such as the content sharing platform 120 of FIG. 1. For example, the user data 253 may include identifying information that can be used to identify the users, such as user identifiers associated with the users.

As another example, the user data 253 may include information related to one or more contacts of a given user, such as user identifiers associated with the contacts, profile images or avatars associated with the contacts, etc. Examples of a contact of the user include a "friend," a "follower," a "subscriber," a "connection," a "phone contact," and/or any other user that is connected to the user via the content sharing platform 120, the mobile platform 150, a social network, an email service, a phone service, and/or any other platform or service.

As a further example, the user data 253 may include information related to content items that have been interacted with by user of the content sharing platform. Information related to a content item consumed by a given user can include identifying information related to the content item (e.g., a content identifier, a description, a title, etc.), etc.

The affinity data 255 may include information related to users' affinities for content items and/or other users. For example, the affinity data 255 may include information related to user interactions with content items. Examples of user interactions with a content item include consuming (e.g., watching, reviewing, reading, etc.) the content item, subscribing to a channel associated with the content item, providing a comment in association with the content item (e.g., using a publicly-available comments section associated with the content item, using a social messaging platform, etc.), liking the content item, reviewing information related to the content item, sharing the content item, uploading the content item to a content sharing platform, etc. In another example, the affinity data 255 may include affinity scores indicative of affinities between users and/or affinities of a user for a content item. These affinity scores can be determined as described in more detail further below.

In some implementations, each piece of information stored in the data store 106 may be associated with an identifier that indicates whether the piece of information is private information or public information. The content sharing component 140 may perform an action (e.g., storing, retrieving, using, etc.) on private information related to a user upon requesting a permission to perform the action and receiving the permission from the user.

In one implementation, a user may designate particular information related to the user (e.g., the user's interactions with a particular content item, the user's interactions with the content sharing platform 120, etc.) as private information or public information. More particularly, for example, the user may designate information related to one or more particular types of interactions with the content sharing platform (e.g., consuming content items via the content sharing platform, etc.) as being private information. The data store 106 then stores the information in association with an identifier indicating that the information is private information.

In another implementation, information related to a user may be stored in the data storage 106 as public information if the information can be obtained without the user's approval of access to the information. For example, such information may include comments provided by the user using a publicly available comments section associated with a content item, information available on a publicly accessible web page associated with the user, etc.

As discussed above, the content sharing component 140 may prompt a first user to share a content item (also referred to herein as "first content item") with one or more other users (also referred to herein as "target users"). The target user recommendation module 210 identifies the target users based on the content item data 251, the user data 253, the affinity data 255, and/or any other suitable information.

For example, the target user recommendation module 210 identifies one or more users that are contacts of the first user (also referred to herein as "contact users") and then selects one or more of the contact users as target users. In one implementation, the contacts of the first user may be identified based on the user data 253 related to the first user (e.g., identifying information related to contacts of the first user). In another implementation, upon the first user granting access to information related to contacts of the first users (e.g., information related to phone contacts of the first user), the target user recommendation module 210 accesses the information and identifies contacts of the first user (e.g., phone contacts).

The target user recommendation module 210 may select target users from the contact users using any suitable technique or combination of techniques. For example, the target user recommendation module 210 can select one or more of the contact users that are connected to the first user via a particular platform and/or in a particular manner. In a more particular example, one or more contact users that have subscribed to content associated with the user (e.g., a channel on the content sharing platform 120) are identified as the target users.

As another example, the target user recommendation module 210 may select one or more target users by performing a clustering analysis. In one implementation, the clustering analysis may be performed based on their interactions with various content items. More particularly, for example, users that have interacted with the same and/or similar content items can be clustered together. The term "clustering" may refer to grouping users together. Similar content items may refer to content items that are associated with the same actors, authors, genres, keywords, etc. Alternatively or additionally, users can be clustered based on the users' likelihood of having watched the same or similar sets of content items. The target user recommendation module 210 may then identify one or more clusters that the contact users fall in and one or more clusters that the first content item fall in. One or more target users can be identified by determining an interaction between the identified clusters.

As yet another example, the target user recommendation module 210 identifies one or more target users based on affinities of the contact users for the first content item and/or affinities between the contact users and the first user. In some implementations, the affinities of the contact users for the content item and/or the affinities between the contact users and the first user can be measured using one or more affinity scores, such as individual scores indicative of the likelihood that the contact users would interact with the first content item, individual affinity scores indicative of affinities between the contact users and the first user, overall affinity scores determined based on the individual affinity scores, etc. In some implementations, the affinity scores can be determined by the affinity score module 220 as described in more detail below.

Each of the affinity scores may be any number, text, and/or value that may be used to indicate affinities of the contact users for the first content item and/or affinities between the contact users and the first user. For example, an affinity score may be a numerical value from 0 to 1 (e.g., 0.8) where a value of 0 indicates no affinity between two users and a value of 1 indicates a very high value of affinity. In another example, an affinity score may be a numerical value from 1 to 10, or 1 to 100, where a higher number indicates of a value of affinity.

The target user recommendation module 210 may identify one or more target users based on affinity scores corresponding to the contact users. For example, the target user recommendation module 210 can identify one or more contact users with an assigned affinity score (e.g., an individual affinity score, an overall affinity score, etc.) over a certain threshold.

As another example, the target user recommendation module 210 can rank the contact users or a set of the contact users by affinity score (e.g., individual affinity score, overall affinity score, etc.). In one implementation, contact users having relatively higher affinity scores may receive higher rankings. In one example, a contact user having the highest affinity may receive a top ranking. The target user recommendation module 210 can then identify a number or proportion of the contact users as target users based on the ranking. In a more particular example, the target user recommendation module 210 can identify a number of the contact users associated with particular affinity scores (e.g., the top ten affinity scores). In another more particular example, the target user recommendation module 210 can identify a certain percentage of the contact users as target users based on the users' affinity score (e.g., the top ten percent of the contact users in terms of affinity score).

In some implementations, the target user recommendation module 210 may determine whether a given contact user is to be selected as a target user by determining a set of content items that the given contact user might be interested in and a set of content items that the first user might be interested in. For example, the target user recommendation module 210 determines one or more content items that the given contact user has interacted with and a set of users that have interacted with the same or similar content items (also referred to herein as the "first set of users"). For example, the target user recommendation module 210 identifies one or more videos that have been watched by the given contact user and a first set of users that have watched the same or similar videos. The target recommendation module 210 then identifies a first set of content items that have been interacted with by one or more of the first set of users (e.g., 50% of the first set of users, 90% of the first set of users, etc.) but not by the contact user. For example, the first set of content items can include videos that have been watched by the first set of users but not watched by the given contact user.

Additionally, the target user recommendation module 210 may identify one or more content items that the first user has interacted with and a second set of users that have interacted with the same or similar content items. For example, the target user recommendation module 210 identifies one or more videos that have been watched by the first user and a set of users that have watched the same or similar videos. The affinity score module 220 may then determine a second set of content items that have been interacted with by one or more of the second set of users (e.g., 50% of the second set of users, 90% of the second set of users, etc.) but not watched by the first user.

The target user recommendation module 210 may then generate a list of content items based on the first set of content items and the second set of content items. For example, the list of content items can include common content items of the first set of content items and the second set of content items. As another example, the list of content items can be and/or include a combination of the first set of content items and the second set of content items. In some implementations, the given contact user can be selected as a target user if the first content item is in the list of content items.

The affinity score module 220 can obtain (e.g., may determine, retrieve, calculate, etc.) one or more affinity scores for one or more of the contact users of the first user. Examples of the affinity scores include individual affinity scores indicative of likelihood that the contact users would interact with the first content item, individual affinity scores indicative of affinities between the contact user and the first user, etc.

In some implementations, the affinity score module 220 may determine an individual affinity score (of the first user for a contact user) indicative of a likelihood that a given contact user would interact with the first content item based on affinities of the contact user for the first content item. For example, the affinity score module 220 may identify one or more content items that the contact user has interacted with (e.g., one or more videos that the contact user has watched, shared, liked, etc.) and a set of users that have interacted with the same identified content items and/or content items related to the identified content items. In some implementations, the set of user may be users of the content sharing platform, the mobile platform, etc. The set of users may be identified by performing a cluster analysis as described above. The affinity score module 220 then determines the affinity score based on a number of the set of users and/or a percentage of the set of users having interacted with the first content item. More particularly, for example, a higher affinity score may be assigned to the contact user when a greater number or percentage of the set of users has interacted with the first content item. In some implementations, the number of the set of users that have engaged with the content item can be normalized by dividing the number of the set of users by the number of users that have engaged with the content item.

In addition to or as an alternative to determining the individual affinity score indicative of the likelihood that the given contact user would interact with the first content item, the affinity score module 220 may determine an individual affinity score indicative of an affinity between the contact user and the first user. The affinity score may be determined based on various measures of affinities between the contact user and the first user, such as the duration of content associated with the first user that has been consumed by the contact user, whether the contact user is an active or inactive user of the content sharing platform 120, a percentage of content consumed by the contact user that is associated with the first user, the number of messages (e.g., emails, notifications, etc.) related to content associated with the first user that have been viewed, replied, and/or forwarded by the contact user, a number of other users that are connected to the contact user, etc. In some implementations, a higher affinity score may be assigned to a contact user that is an active user of the content sharing platform 120 and/or that is connected to a given number of other users (e.g., a number less than a threshold value).

In some implementations, the affinity score module 220 may determine an overall affinity score for a given contact user based on multiple individual affinity scores. For example, the affinity score module 220 may determine an overall affinity score for a given contact user by combining multiple individual affinity scores determined for the given contact user (e.g., an individual score indicative of a likelihood that the contact user would interact with the first content item, an individual score indicative of affinities between the contact user and the first user, etc.). In a more particular example, a first individual affinity score can be a multiplier for a second individual affinity score. In another more particular example, the overall affinity score can be a weighted sum, a weighted average, and/or any other suitable combination of the multiple individual affinity scores.

Affinity scores (e.g., individual affinity scores, overall affinity scores, etc.) may be determined for the contact users based on particular information related to user interactions with content items. For example, the affinity scores may be determined based on information related to one or more particular types of user interactions with content items, such as consuming the content items, commenting on the content items, sharing the content items, etc.

As another example, the affinity score may be determined based on public information related to user interactions with content items. Private information related to a user's interactions with content items may also be used upon receiving the user's permission of such use. Additionally, the affinity score module 220 can determine an affinity score using public information and compare the affinity score with a threshold. In response to determining that the affinity score is greater than the threshold, the affinity score module 220 may then modify the affinity score based on the private information (e.g., by calculating an updated affinity score based on the private information and the public information).

The content sharing UI module 230 may then provide a prompt to the first user to share the first content item with the target users. The prompt can include video content, audio content, text, images, and/or any other content. In one example, the prompt can be provided by sending a message to a computing device of the first user (e.g., a client device 110 of FIG. 1) by email, text message, mobile notification, account notification, etc.

Figure 3A:
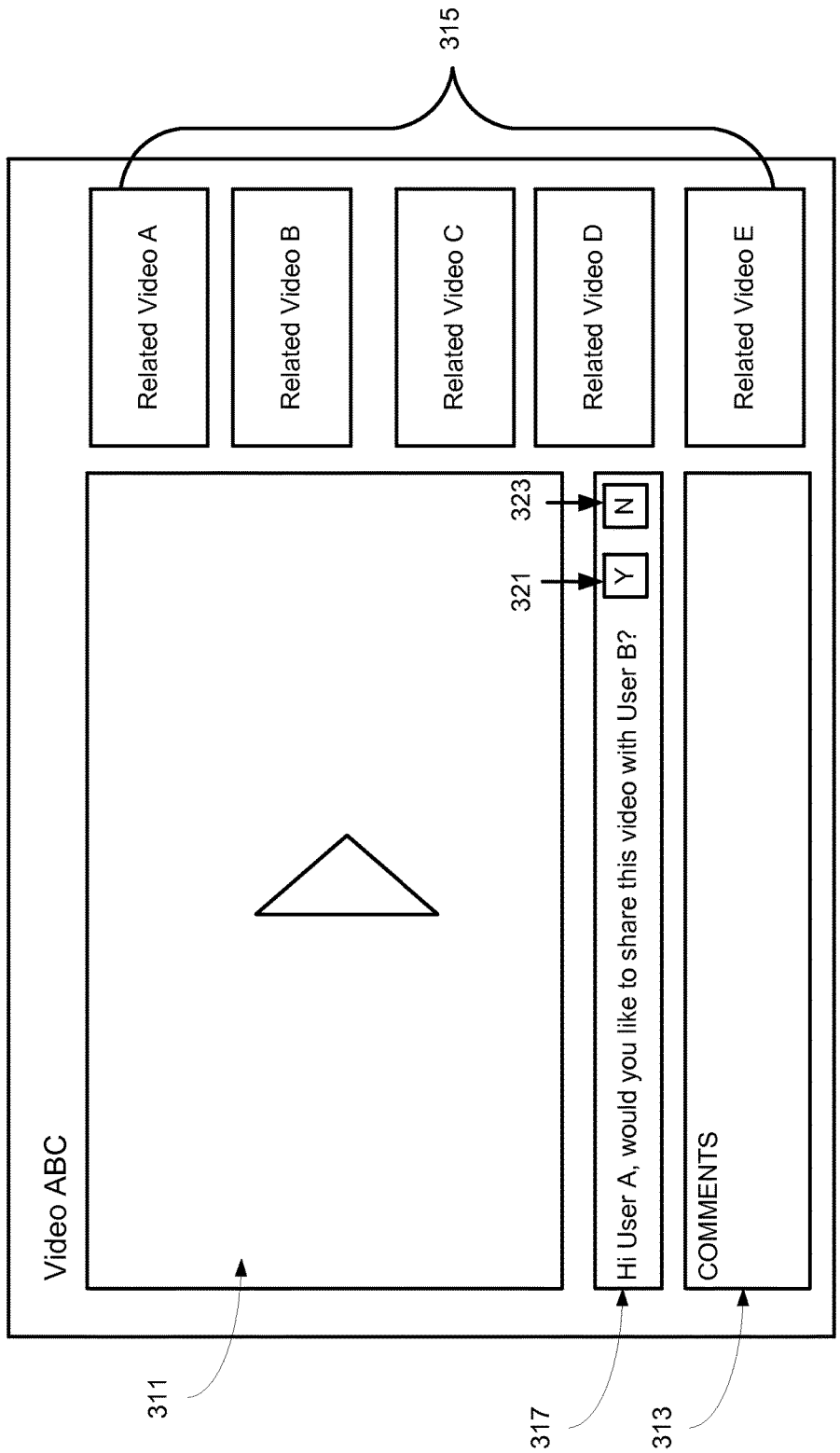
FIG. 3A is an example of a user interface that can be used for providing personalized content sharing functionality, according to one implementation of the disclosure.

In another example, the prompt can be sent along with data for use to render one or more user interfaces and can be presented as part of the user interfaces. Examples of the user interfaces include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, etc. In a more particular example, one or more user interfaces 310, 330, and 350 as illustrated in FIGS. 3A-B may be used to prompt the first user to share the first content item with the target users.

In some implementations, the first user may select one or more of the target users to share the first content item. For example, this selection can be made using one or more user interfaces provided by the content sharing UI module 230, such as user interfaces 330 and/or 350 as illustrated in FIG. 3B.

Figure 3B:
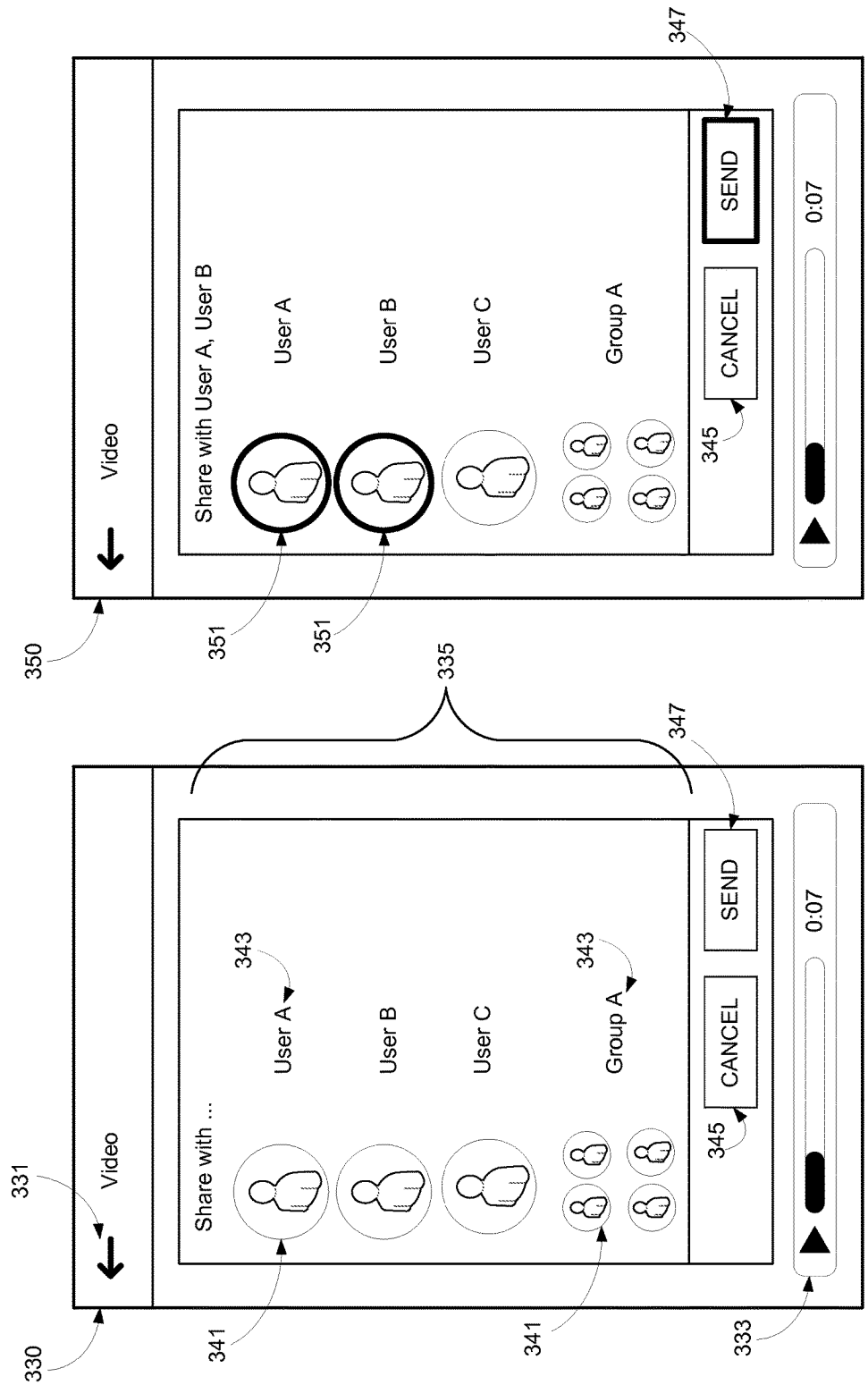
FIG. 3B illustrates examples of user interfaces for providing personalized content sharing functionality, according to another implementation of the disclosure.

Upon receiving an indication that the first content item is to be shared with one or more target users (e.g., a user selection of one or more user interface elements corresponding to the target users and/or a user selection of a "send" button as shown in FIG. 3B), content sharing module 240 may cause information related to the first content item to be sent to one or more computing devices of the target users. For example, the content sharing module 240 may initiate a conversation between the first user and the target user(s) using chat and/or messaging functionality provided by the media viewer 111, a chat application, a messaging application, and/or any other suitable application. In some implementations, the content sharing module 240 may cause information related to the first content item (e.g., a URL, an image, a video clip, etc.) to be presented in the conversation.

As another example, the content sharing module 240 can send a message to client devices of the target users. The message can include any suitable information related to the first content item, such as a link (e.g., a uniform resource locator (URL)) directed to the first content item, an image associated with the target item, an indication that identifies the first user, etc. The message and its associated content can be sent to the target users by email, text messages, mobile notifications, account notifications, etc.

In some implementations, the functionality of the content sharing component 140 and data store 106 described in FIG. 2 may be performed wholly, or in part, on a client device.

Turning to FIG. 3A, an example of a user interface 310 for providing personalized content sharing functionality in accordance with some implementations of the disclosed subject matter is shown.

As illustrated, the interface 310 may include a content player 311 that can be used to provide playback of content items (e.g., videos). In some implementations, a content item can be played back along with information related to the content item, such as a title of the content item, a thumbnail image representative of the content item, and any other information related to the content item.

The interface 310 may include a comment section 313 and a content recommendation interface 315. A user may provide comments on the content item using the comment section 313. The content recommendation interface 313 may be used to present content items that are related to the content item being played using the content player 311 (e.g., content items having the same or similar topics, genres, keywords, etc.).

The interface 310 may also include a message 317 to prompt a viewer (e.g., the first user) of the content item to share the content item with one or more target users. In some implementations, the viewer may indicate that the content item is to be shared with the target users by selecting button 321. Alternatively, the viewer may minimize or dismiss the message 340 by selecting a button 323.

The message 317 may include identifying information related to the target user(s), such a user name of the target user(s), an image representative of an account associated with the target user(s), etc. The message 317 may include text, images, video, and/or any other content. The message 317 may be positioned in any suitable portion of the user interface 310. For example, the message 317 and the content player 311 may overlap in some implementations. In another example, the message 317 may be positioned between the content player 311 and the comment section 313.

While the message 317 is shown as a text message, this is merely illustrative. For example, the message 317 may be presented as a video or banner in the content player 311.

FIG. 3B illustrates examples of user interfaces 330 and 350 for providing personalized content sharing functionality in accordance with some implementations of the disclosed subject matter.

In some implementations, user interfaces 330 and/or 350 may be presented to the first user during playback of the first content item. The user interface 330 may include a "return" button 331. The playback of the first content item can be resumed responsive to a user selection of the "return" button 335. The user interface 330 may also include a playback control component 333 for controlling the playback of the first content item (e.g., rewinding, forwarding, pausing, etc. the playback of the first content item).

As illustrated, the user interface 330 may include one or more user interface elements 335 for presenting information of one or more target users with which the first user can share the first content item. The target users may be identified by the target user recommendation module 210 as described above in connection with FIG. 2. For example, user interface elements 335 can include an avatar, image, or any other suitable representation 341 of a given target user or a group of target users (e.g., a group of contact users related to the first user). As another example, the user interface elements 335 can include a username 343 of each target user or group of target users.

The first user may select one or more of the target users to share the first content item (e.g., by selecting the images 341 or any other UI elements corresponding to the target users and/or groups of target users). The user interface 350 may then be presented to the first user (e.g., by the content sharing UI module 230 of FIG. 2). As shown in FIG. 3B, the user interface 350 may visually illustrate (e.g., using highlighted images 351, highlighted names, or any other visual indicator) that the target users and/or groups of target users have been selected for sharing.

The first user may initiate sharing of the first content item with the selected target user(s) by selecting a "send" button 347. The sharing can be cancelled in response to receiving a user selection of a "cancel" button 345.

FIG. 4 is a flow diagram illustrating a method 400 for providing personalized content sharing by a client device, according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a processing device executing a media viewer 111 as shown in FIG. 1.

As illustrated, method 400 begins at block 405 when the processing device transmits, to a server device, a request pertaining to a first user. For example, the request may be and/or include a request to perform an action on the content item, such as uploading the content item to a content sharing platform, presenting information related to the content item, providing playback of the content item, etc.

At block 410, processing device can receive data for use to prompt the first user to share the content item with one or more target users and/or to perform the action. The data may include video data associated with the content item, audio data associated with the content item, data for use in presenting a message and/or a user interface for prompting the first user to sharing the content item with the target users, etc.

At block 415, the processing device can provide a prompt to the first user to share the content item with the target users using the received data. The prompt can be provided by presenting video content, audio content, text, images, and/or any other content. For example, the prompt can be provided by presenting one or more user interfaces 310, 330, and/or 350 as illustrated in FIGS. 3A-3B.

At block 420, the processing device receives an indication to share the content item with one or more of the target user(s). The indication may correspond to any user input, such as a user selection of one or more target users, a button 321, and/or a "send" button 347 of FIGS. 3A and 3B, a voice command, a user gesture, etc. The indication may include a user selection of the one or more target users. At block 425, the processing device can transmit a request to share the content item with the target user(s) to the server device.

Figure 5:
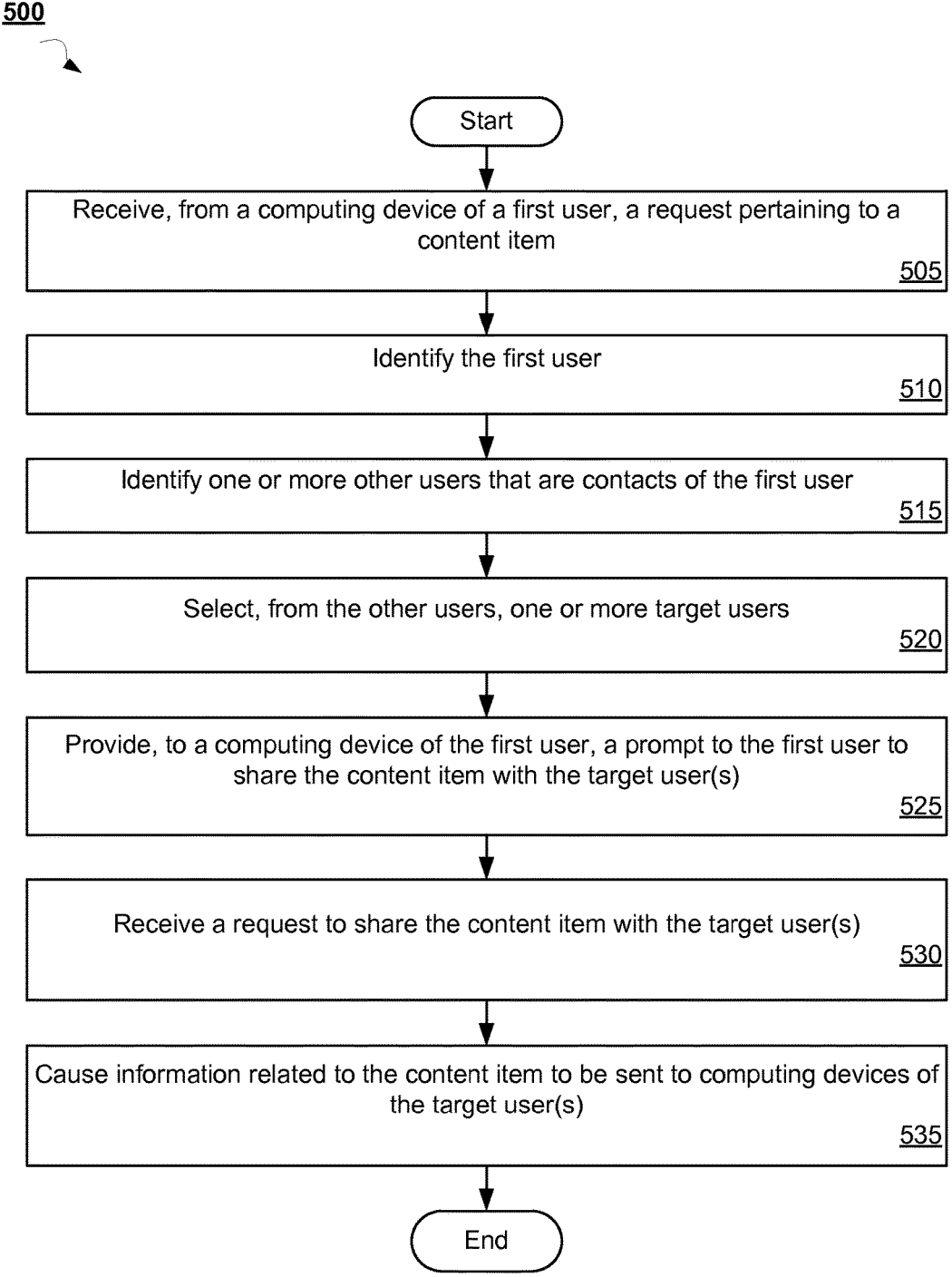
FIG. 5 is a flow diagram illustrating a method for providing personalized content sharing functionality by a server device, according to some implementations of the disclosure.

FIG. 5 is a flow diagram illustrating a method 500 for providing personalized content sharing by a server device, according to an implementation of the disclosure. Method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by a processing device executing the content sharing component 140, as shown in FIGS. 1 and 2.

As illustrated, method 500 begins at block 505 when the processing device receives, from a computing device of a first user, a request pertaining to a content item. In some implementations, the request can be and/or include a request to perform an action on the content item for the first user, such as uploading the content item to a content sharing platform, presenting information related to the content item, providing playback of the content item, etc.

At block 510, the processing device can identify the first user. For example, the first user can be identified using a user identifier associated with the first user, an identifier associated with a channel of the content sharing platform that is associated with the first user, etc.

At block 515, the processing device can identify one or more other users that are contacts of the first user. For example, the processing device identifies one or more other users (e.g., contact users) that are connected to the first user via a content sharing platform, a mobile platform, a social network platform, an email service, a phone service, etc.

At block 520 the processing device can select, from the other users, one or more target users. For example, the processing device can select as target users one or more of the other users that have subscribed to content associated with the first user on a content sharing platform. As another example, the processing device selects the target users based on affinity scores associated with the other users. In a more particular example, the target users can be identified by performing one or more operations as described below in connection with FIG. 6. As yet another example, the processing device selects each of the other users as target users.

At block 525, the processing device provides, to a computing device of the first user, a prompt to the first user to share the content item with the selected target users. For example, the processing device can provide data for use in prompting the first user to share the content item with one or more of the target users. The data may include video data associated with the content item, audio data associated with the content item, data for use in presenting a message and/or a user interface for prompting the first user to sharing the content item with the target users, etc.

At block 530, the processing device receives a request to share the content item with the target user(s). In some implementations, the request can include a user selection of one or more of the target users with which the content item is to be shared.

At block 535, the processing device can cause information related to the content item to be sent to computing devices of the target user(s). For example, the processing device initiate a conversation between the first user and the target user(s) using a mobile platform, a content sharing platform, a social network, and/or any other suitable platform or service.

Figure 6:
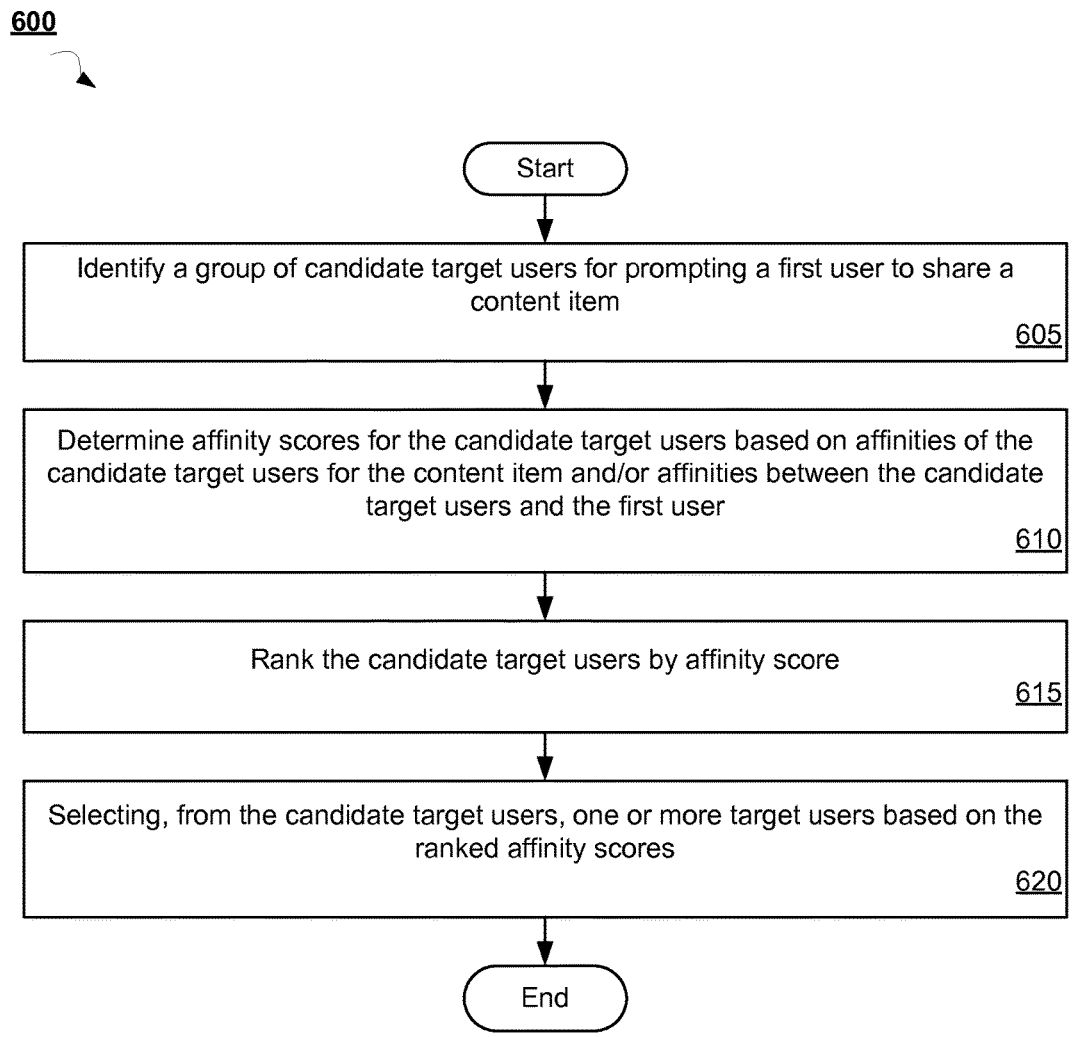
FIG. 6 is a flow diagram illustrating a method for identifying target users for content sharing, according to some implementations of the disclosure.

FIG. 6 is a flow diagram illustrating an example of a method 600 for identifying target users for personalized content sharing, according to an implementation of the disclosure. Method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by a processing device executing the content sharing component 140, as shown in FIGS. 1 and 2.

As illustrated, method 600 begins at block 605 when the processing device identifies a group of candidate target users for use in prompting a first user to share a content item. For example, the processing device identifies contacts of the first user as the candidate target users. As another example, the processing device identifies one or more other users that have subscribed to content associated with the first user as candidate target users. As yet another example, the processing device identifies one or more other users by performing a cluster analysis as described above in connection with FIG. 2.

At block 610, the processing device can determine affinity scores for the candidate target users. For example, the processing device determines an individual affinity score for each candidate target user based on an affinity of the candidate target user for the content item. As another example, the processing device determines an individual affinity score for each candidate target user based on affinities between the candidate target user and the first user. As yet another example, the processing device determines an overall affinity score based on multiple individual affinity scores (e.g., between candidate target user and the first content item, between candidate target user and first user, etc.) for each candidate target user. In a more particular example, one or more affinity scores can be determined for a candidate target users by performing one or more operations as described in connection with FIG. 7.

At block 615, the processing device can rank the candidate target users by affinity score (e.g., by individual affinity score, by overall affinity score, etc.). At block 620, the processing device can select one or more target users based on the ranked affinity scores. For example, the top X candidate target users with the highest affinity scores are selected. In another example, the candidate target users with an affinity score above a threshold affinity score value are selected. In some implementations, the predetermined number and/or the threshold affinity score value can be configured by an administrator of the content sharing platform, the first user, etc.

Figure 7:
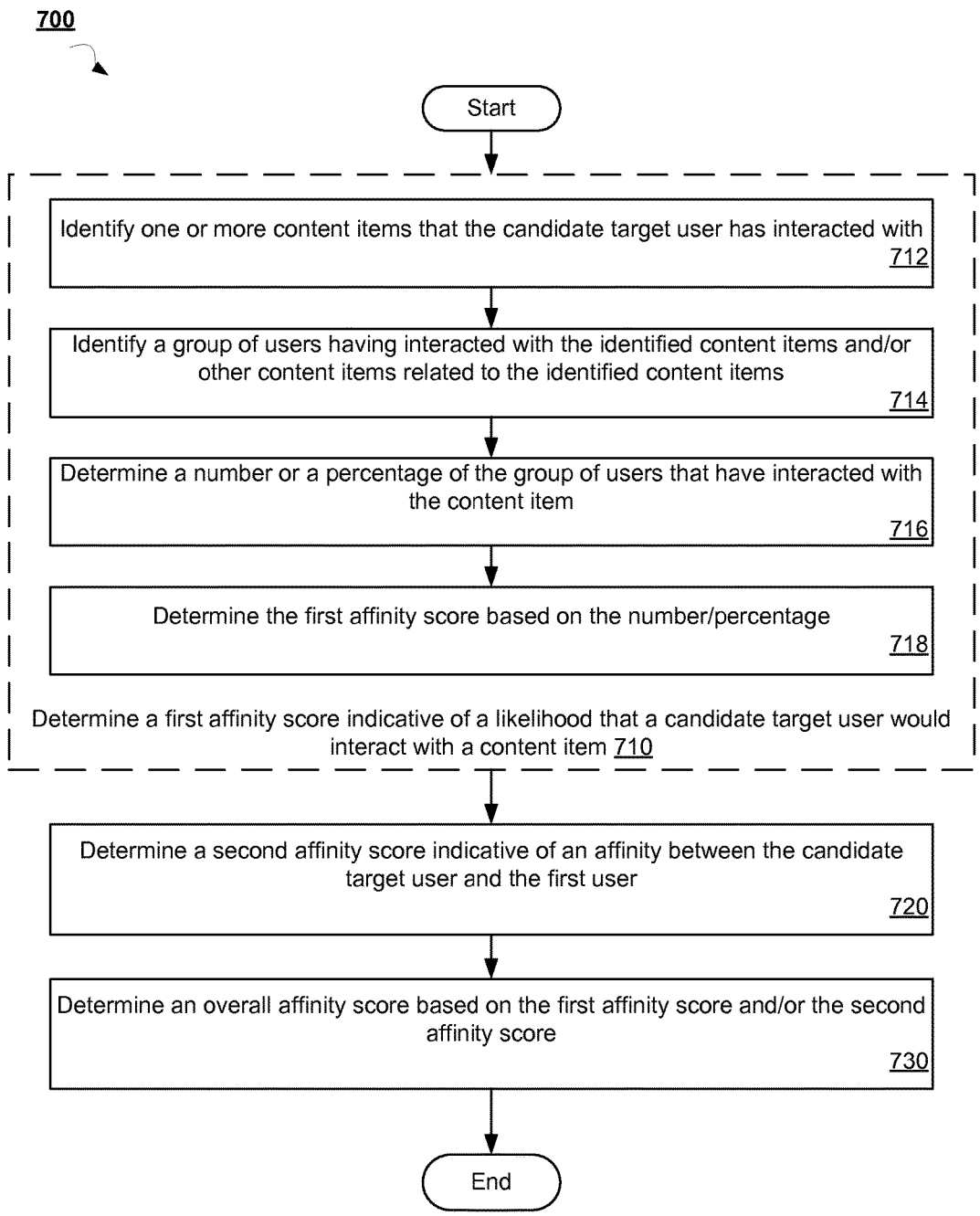
FIG. 7 is a flow diagram illustrating a method for determining affinity scores for a candidate target user, according to some implementations of the disclosure.

FIG. 7 is a flow diagram illustrating an example of a method 700 for determining an affinity score for a candidate target user, according to an implementation of the disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. In one implementation, method 700 may be performed by a processing device executing the content sharing component 140, as shown in FIGS. 1 and 2.

As illustrated, method 700 begins at block 710 when the processing device determines a first affinity score indicative of a likelihood that the candidate target user would interact with a content item. For example, at block 712, the processing device can identify one or more content items that the candidate target user has interacted with. For example, the processing device identifies one or more content items that the candidate target user has consumed.

At block 714, the processing device can identify a group of users having interacted with the content items and/or other content items related to the identified content item. For example, the processing device identifies the group of users that have consumed the identified content item.

At block 716, the processing device can determine a number of the group of users that have interacted with a first content item. At block 718, the processing device can determine the first affinity score based on the number or percentage determined at block 716.

At block 720, the processing device can determine a second affinity score indicative of affinities between the candidate target user and the first user. At block 730, the processing device can determine an overall affinity score based on the first affinity score and/or the second affinity score. For example, the processing device determines the overall affinity score by calculating a weighted sum, a weighted average, and/or any other suitable combination of the first affinity score and the second affinity score.

Figure 8:
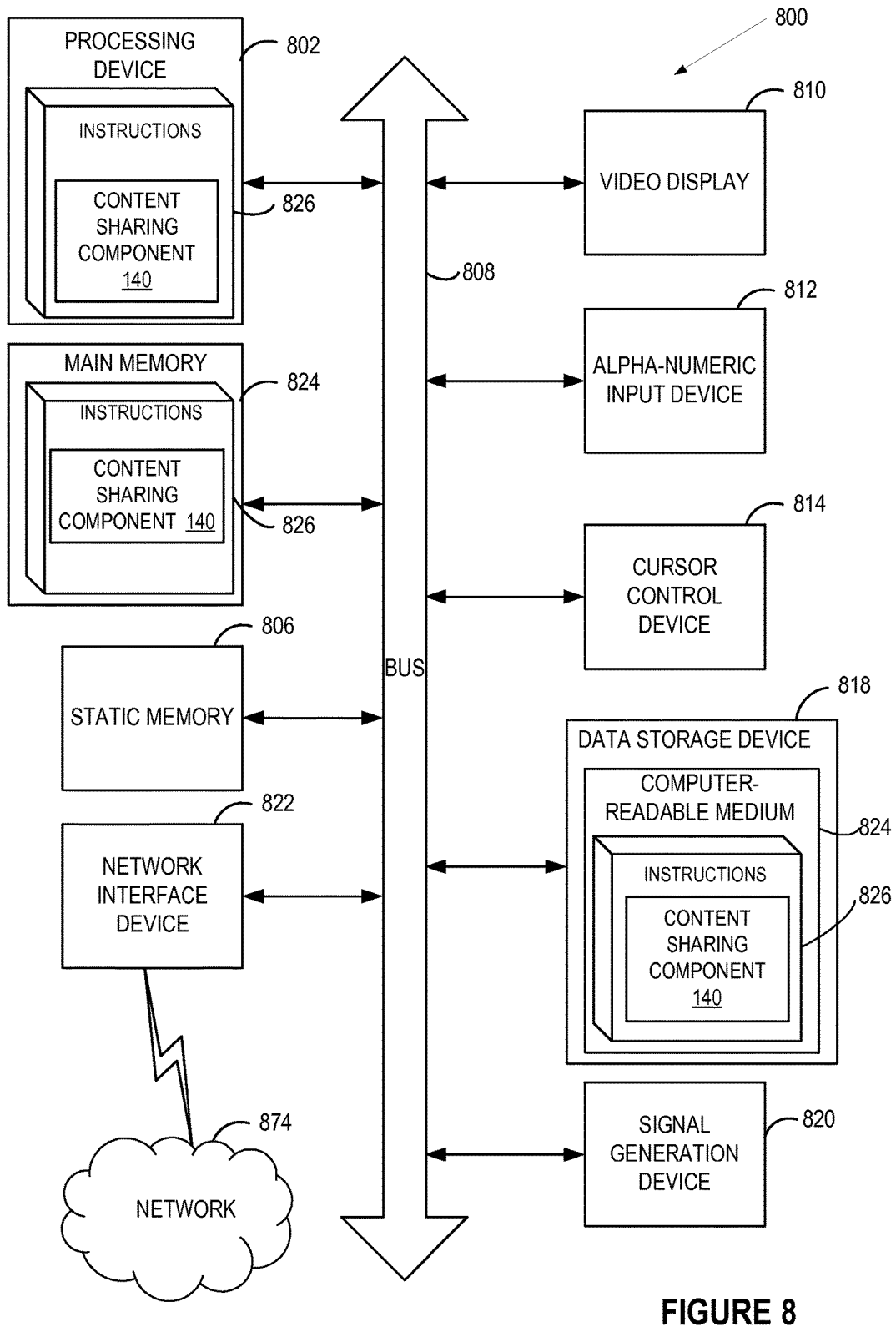
FIG. 8 is a block diagram illustrating an exemplary example of a computer system, according to some implementations.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD), a cathode ray tube (CRT), or a touch screen), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one embodiment, the instructions 826 include instructions for the content sharing component 140 as described with respect to FIGS. 1 and 2, and/or a software library containing methods that provide a content sharing component for a content sharing platform. While the computer-readable storage medium 824 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for personalized sharing of videos on a content sharing platform, the method comprising:
   receiving, by a processing device from a first computing device of a first user of the content sharing platform, a request pertaining to a first video;
   determining affinity scores corresponding to a first plurality of other users that are contacts of the first user on the content sharing platform, the determining based on affinities of the first plurality of other users for the first video;
   selecting, from the first plurality of other users, a subset of the contacts of the first user who are expected to interact with the first video, the selected subset of contacts of the first user comprising a second user of the first plurality of other users and excluding a third user of the first plurality of other users, the selecting based on the affinity scores corresponding to the first plurality of other users; and
   providing, to the first computing device, a prompt for the first user to share the first video with the second user from the selected subset of contacts of the first user while refraining from providing a prompt for the first user to share the first video with the third user from the first plurality of other users.

2. The method of claim 1, further comprising:
   receiving, from the first computing device in view of the prompt, an indication that the first video is to be shared with the second user; and
   causing information of the first video to be sent to a second computing device of the second user.

3. The method of claim 1, wherein the affinity scores are further based on affinities between the first plurality of other users and the first user.

4. The method of claim 1, wherein determining the affinity scores further comprises determining a first affinity score indicative of a likelihood that the second user would interact with the first video.

5. The method of claim 4, wherein determining the affinity scores further comprises determining a second affinity score indicative of an affinity between the second user and the first user.

6. The method of claim 5, wherein determining the affinity scores further comprises determining a third affinity score based on at least one of the first affinity score or the second affinity score, wherein the second user is further determined based at least in part on the third score.

7. The method of claim 1, further comprising ranking the plurality of affinity scores, wherein the second user is further determined based on the ranking.

8. The method of claim 1, further comprising:
identifying, using the processing device, at least one second video that the second user and a second plurality of users have interacted with; and
identifying a first set of videos that the second plurality of users have interacted with.

9. The method of claim 8, further comprising:
identifying, using the processing device, at least one third video that the first user and a third plurality of users have interacted with; and
identifying a second set of videos that the third plurality of users have interacted with, wherein the second user is further determined based on the first set of videos and the second set of videos.

10. The method of claim 1, wherein the first plurality of other users are connected to the first user via at least one of a content sharing platform, a mobile platform, a social network platform, an email server, or a phone service.

11. The method of claim 1, further comprising causing information related to the first video to be sent to a plurality of computing devices of a plurality of target users in response to receiving an indication that the first video is to be shared with the plurality of target users.

12. An apparatus for personalized sharing of videos on a content sharing platform, comprising:
a memory; and
a processing device communicably coupled to the memory, the processing device to execute instructions to:
receive, from a first computing device of a first user of the content sharing platform, a request pertaining to a first video;
determine affinity scores corresponding to a first plurality of other users that are contacts of the first user on the content sharing platform, the determining based on affinities of the first plurality of other users for the first video;
select, from the first plurality of other users, a subset of the contacts of the first user who are expected to interact with the first video, the selected subset of contacts of the first user comprising a second user of the first plurality of other users and excluding a third user of the first plurality of other users, the selecting based on the affinity scores corresponding to the first plurality of other users; and
provide, to the first computing device, a prompt for the first user to share the first video with the second user from the selected subset of contacts of the first user while refraining from providing a prompt for the first user to share the first video with the third user from the first plurality of other users.

13. The apparatus of claim 12, wherein the processing device is further to:
receive, from the first computing device in view of the prompt, an indication that the video is to be shared with the second user; and
cause information of the video to be sent to a second computing device of the second user.

14. The apparatus of claim 12, wherein the processing device is further to determine the affinity scores based on affinities between the first plurality of other users and the first user.

15. The apparatus of claim 12, wherein the processing device is further to determine a first affinity score indicative of a likelihood that the second user would interact with the video.

16. The apparatus of claim 15, wherein the processing device is further to determine a second affinity score indicative of an affinity between the second user and the first user.

17. The apparatus of claim 15, wherein the processing device is further to cause information related to the video to be sent to a plurality of computing devices of a plurality of target users in response to receiving an indication that the video is to be shared with the plurality of target users.

18. A non-transitory machine-readable storage medium storing instructions which, when executed, cause a processing device to:
receive, from a first computing device of a first user of the content sharing platform, a request pertaining to a first video;
determine, using the processing device, affinity scores corresponding to a first plurality of other users that are contacts of the first user on the content sharing platform, the determining based on affinities of the first plurality of other users for the first video;
select, from the first plurality of other users, a subset of the contacts of the first user who are expected to interact with the first video, the selected subset of contacts of the first user comprising a second user of the first plurality of other users and excluding a third user of the first plurality of other users, the selecting based on the affinity scores corresponding to the first plurality of other users; and
provide, to the first computing device, a prompt for the first user to share the first video with the second user from the selected subset of contacts of the first user while refraining from providing a prompt for the first user to share the first video with the third user from the first plurality of other users.

19. The non-transitory machine-readable storage medium of claim 18, wherein the processing device is further to:
receive, from the first computing device in view of the prompt, an indication that the video is to be shared with the second user; and
cause information of the video to be sent to a second computing device of the second user.

20. The non-transitory machine-readable storage medium of claim 18, wherein the processing device is further to cause information related to the video to be sent to a plurality of computing devices of a plurality of target users in response to receiving an indication that the video is to be shared with the plurality of target users.

* * * * *